United States Patent [19]
Gripp et al.

[11] Patent Number: 6,067,149
[45] Date of Patent: May 23, 2000

[54] DISPERSION-MAP MEASUREMENTS OF OPTICAL FIBERS

[75] Inventors: Jurgen Gripp, Long Branch; Linn F. Mollenauer, Colts Neck, both of N.J.

[73] Assignee: Lucent Technologies, Murray Hill, N.J.

[21] Appl. No.: 09/211,201

[22] Filed: Dec. 14, 1998

Related U.S. Application Data

[60] Provisional application No. 60/087,001, May 28, 1998.
[51] Int. Cl.[7] .................................................. G01N 21/00
[52] U.S. Cl. ............................................................ 356/73.1
[58] Field of Search ............................................. 356/73.1

[56] References Cited

U.S. PATENT DOCUMENTS 5,619,320  4/1997  Eiselt et al. ............................ 356/73.1
5,724,126  3/1998  Nishi et al. ............................. 356/73.1

*Primary Examiner*—Frank G. Font
*Assistant Examiner*—Tu T. Nguyen

[57] ABSTRACT

Apparatus for measuring the dispersion and dispersion parameter of an optical fiber as a function of distance (the dispersion map) by the optical-time-domain reflection technique uses a multi-frequency laser with an extra cavity semiconductor optical amplifier switch to generate the short pulses of two wavelengths to displace the four-wave mixing oscillations away from the origin of the complex plane. Additionally laser power is supplied at both ends of the fiber under test to provide pump power to Raman amplify the backscattered signal being measured. Finally a novel Fast Fourier Transform based algorithm is used to calculate the dispersion map fast and accurately.

11 Claims, 2 Drawing Sheets

DISPERSION-MAP MEASUREMENTS OF OPTICAL FIBERS

This claims the benefit of our provisional application Ser. No. 60/087,001 filed on May 28, 1998 entitled "Enhanced Range for OTDR-like Dispersion-Map Measurements."

FIELD OF THE INVENTION

This invention relates to dispersion measurement techniques and more particularly to the dispersion measurements of an optical fiber of the kind useful for long distance transmission of an optical signal.

BACKGROUND OF THE INVENTION

Optical fibers are rapidly becoming the medium of choice for long distance transmission of information.

An important parameter of optical fibers for the transmission of optical pulses is the chromatic dispersion as a function of distance, hereafter referred to as the dispersion map. For the design of high capacity fiber optic transmission systems as well as for the upgrade of existing installed systems, it has become essential to be able to measure dispersion maps in a fast, accurate and convenient manner.

There have been attempts to measure the dispersion based on modulational instability or phase-matching of four-wave-mixing (FWM) products, either in transmission or reflection. All these approaches require extensive, time consuming data collection, and the spatial information has to be extracted from a convoluted, and potentially ambiguous, amplitude profile. The optical-time-domain-reflection (OTDR)-like technique, described in *Opt. Lett.* 21, 1724 (1996) by L. F. Mollenauer, P. V. Mamysher, and M. J. Neubelt, on the other hand, completely and uniquely overcomes those disadvantages. As previously demonstrated, access to only one end of the fiber is required, the data acquisition takes place in a couple of seconds, the spatial information is direct, unambiguous, and of high resolution, and the dispersion uncertainty is small. This technique has already been used for quality control in the manufacture of dispersion-shifted (DS) and dispersion compensating (DC) fiber, and for the evaluation of installed fibers in the field.

The OTDR-like technique can be sketched as follows: A relatively strong sub-microsecond pulse consisting of two frequencies, $\omega_1$ and $\omega_2$, that are copolarized, is sent into the fiber under test to produce FWM signals, either at the Stokes frequency $\omega_S = 2\omega_1 - \omega_2$ or the anti-Stokes frequency $\omega_A = 2\omega_2 - \omega_1$. The phase-mismatch $\delta k$ due to chromatic dispersion causes spatial oscillations of the fields at $\omega_S$ and $\omega_A$, e.g. $\delta k(\lambda_S, z) = -2\pi c D(\lambda_1, z)(\delta\omega/\omega_1)^2$, where z is the distance into the fiber, c is the speed of light, D is the dispersion parameter, and $\delta\omega = \omega_2 - \omega_1$. Once again, it is important to note that this relation is exactly independent of the third order dispersion. As observed in Rayleigh backscattering, the spatial oscillations of the sidebands become temporal oscillations, whose frequency at time t is proportional to $D(\lambda_1, z=ct/2n)$.

SUMMARY OF THE INVENTION

This invention is an improved method and system for measuring an optical fiber's chromatic dispersion as a function of distance that increases the range, reliability, and sensitivity of the measurement, first, by seeding with a coherent field at the Stokes (or anti-Stokes) frequency to displace the oscillation of the created field away from zero, second, by using a straightforward Fast Fourier Transform (FFT) based algorithm that efficiently extracts the maximum information from the data for production of an accurate dispersion map, and third, by amplifying the signal being measured by using Raman gain.

The use of a coherent field increases over the previous design both the reliability and the sensitivity of our method. With respect to reliability, one could envision a situation where a sudden change in the dispersion causes the Stokes vector to rotate around a center at or near the origin of the complex plane, so that the measured oscillations in signal power tend to disappear. This problem has been solved by adding a coherent field to displace the Stokes oscillation away from the origin. The coherent or "seed" field is conveniently produced from the strong FWM in the semiconductor optical amplifier switch (SOA) we have used to replace the acousto-optic modulator of the previous design. The laser source preferably used in the present invention has this SOA built into a multi-frequency laser (MFL). The seed field also tends to increase the sensitivity of the measurements, since the detected signal results from the beat between the (relatively large) seed field and the (weaker) FWM field generated in the fiber. In particular, the use of the seed field has enabled us to significantly extend the range of the measurements, even without Raman gain.

Another improvement impacts the speed, ease, and accuracy of the data acquisition and analysis. We have replaced the previously used digitizing oscilloscope with a personal computer, equipped with a data acquisition board. Additionally, we devised a simple and fast algorithm that calculates the dispersion and the dispersion parameter as a function of distance. The algorithm converts the linear oscillation given by the signal into a circular oscillation by taking the FFT, eliminating the negative part of the symmetric spectrum, and taking the inverse FFT. The resulting signal is a curve that spirals around in the complex plane. The absolute value of D(z), the dispersion with distance, is directly proportional to the curvature of this complex signal.

Still another improvement over the previous form extends the range of this technique with the help of Raman gain. Fiber loss causes an attenuation of the waves at $\lambda_1$ and $\lambda_2$, the wavelengths of the signals supplied for tests, and of the backscattered signal, resulting in a characteristic signal decay length four times shorter than the characteristic absorption length. However, by sending a few hundred milliwatts of Raman pump light into the fiber, from either the near end, the far end, or both ends, one can maintain a measurable signal power over significantly longer distances. Even in this case, the measurement itself requires access from only one end of the fiber, since the pump sources do not require any synchronization with the measurement. Thus, even with Raman gain, the OTDR-like technique maintains its unique and very important ability to measure the dispersion maps of installed fibers in the field.

The invention will be better understood from the following more detailed scription taken in conjunction with the accompanying drawing.

DETAILED DESCRIPTION

Figure 1:
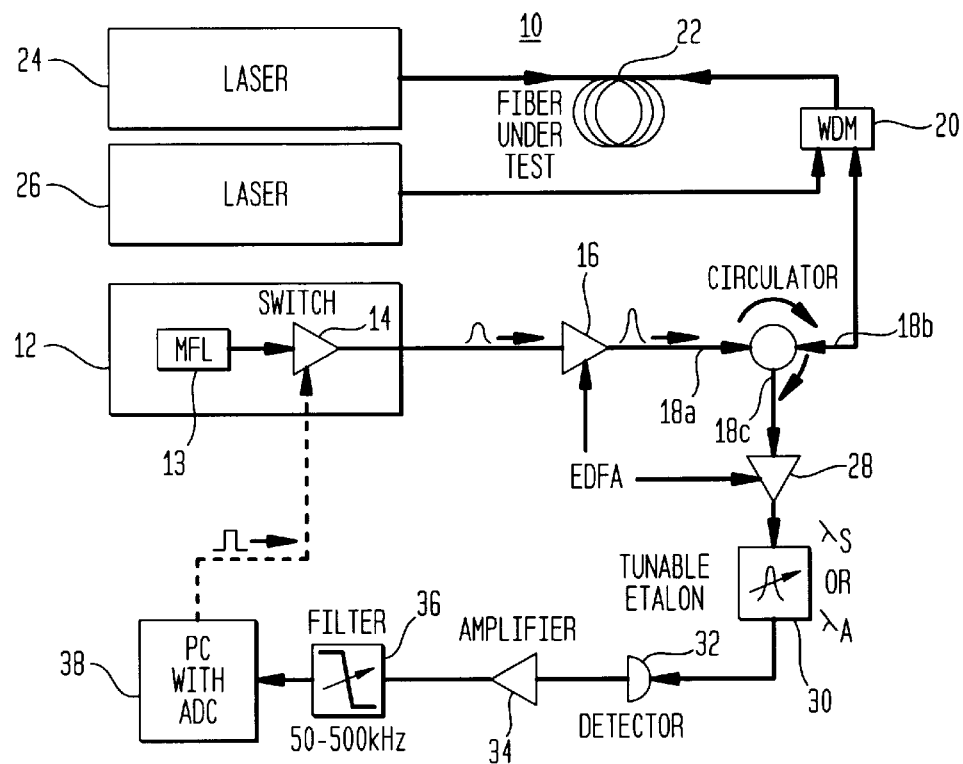
FIG. 1 is a schematic of an example of the apparatus used to make the dispersion measurement in accordance with the invention.

With reference now to the drawing, FIG. 1 shows schematically an illustrative embodiment of measuring apparatus 10 in accordance with the invention. It includes the combination 12, of MFL 13 and a semiconductor optical amplifier switch 14 that generates 0.9 microsecond pulses consisting of copolarized light at frequencies $\omega_1$ and $\omega_2$. This combination 12 has been described in *IEEE Photon. Technol. Lett.* 10, 1374 (1998) by C. R. Doerr, C. H. Joyner, L. W. Stulz, and J. Gripp, whose teaching is incorporated herein by reference. The output pulses are supplied to an Erbium-doped fiber amplifier 16 (EDFA) of the kind well known in the art that amplifies the pulses to up to 1 watt before they pass through an optical circulator 18 by way of ports 18A and 18B and a wave-division multiplexer 20 into one end of the fiber 22 under test. To provide Raman gain, a first laser 24 supplies pumping power from one end of the fiber and a second laser 26 supplies pumping power from the other end of the fiber by way of the WDM. Rayleigh backscattered light enters circulator 18 by way of port 18B and exits from the third port 18C for amplification by EDFA 28. A narrow tunable etalon 30 selects the Stokes signal $\lambda_S$ or the anti-Stokes signal $\lambda_A$. The chosen optical wavelength signal is detected in detector 32, amplified in amplifier 34, filtered in filter 36 and then supplied to the personal computer 38.

Figure 2A:
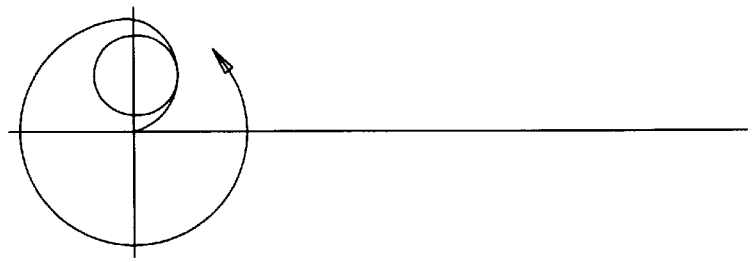
FIGS. 2A and 2B are diagrams useful in the explanation of the invention.
Figure 2B:
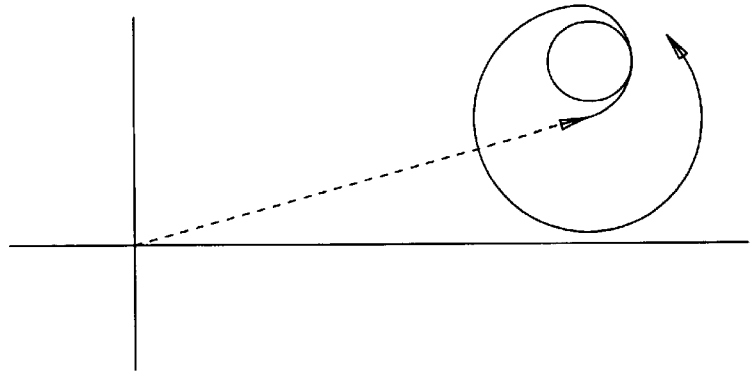

Basically the apparatus described operates as follows. A strong microsecond pulse consisting of frequencies $\omega_1$ and $\omega_2$ provided initially from laser 12 is sent into the fiber under test to produce four wave-mixing (FWM) products, either at the Stokes frequency $\omega_S = 2\omega_1 - \omega_2$ or the anti-Stokes frequency $\omega_A = 2\omega_2 - \omega_1$. The phase mismatch $\delta k$ due to chromatic dispersion causes spatial oscillations of the fields at $\omega_S$ and $\omega_A$, e.g., $\delta k(\lambda_S, z) = -2\pi c D(\lambda_1, z)(\delta\omega/\omega_1)^2$. The spatial oscillations of the sidebands become temporal oscillations, whose frequency at time t is proportional to $D(\delta_1, z=ct/2n)$. As discussed above, one improvement over the previous apparatus mentioned was the addition of a coherent field to displace the Stokes oscillation away from the origin as seen in FIG. 2B to provide against the possibility that a sudden change in the dispersion might cause the Stokes vector to rotate about a center at or near the origin of the complex plane, so that the required oscillations in the signal power tend to disappear, as seen in FIG. 2A. The coherent or "seed" field is conveniently produced from the strong FWM produced in the semiconductor-amplifier switch provided by the MFL. The seed field tends to increase the sensitivity of the measurements, since the detected signal results from the beat between the relatively large seed field and the relatively weaker FMW field generated in the fiber.

In the apparatus 10 shown in FIG. 1, the data acquisition and analysis are done with a personal computer (PC) 28 equipped with a data acquisition board with a 12 bit analog to digital converters (ADC) and a sampling rate of 10 MHz. The computer is programmed to take a user-specified number of measurements and display the average signal; typically thousands of scans can be taken in a few seconds.

Figure 3:
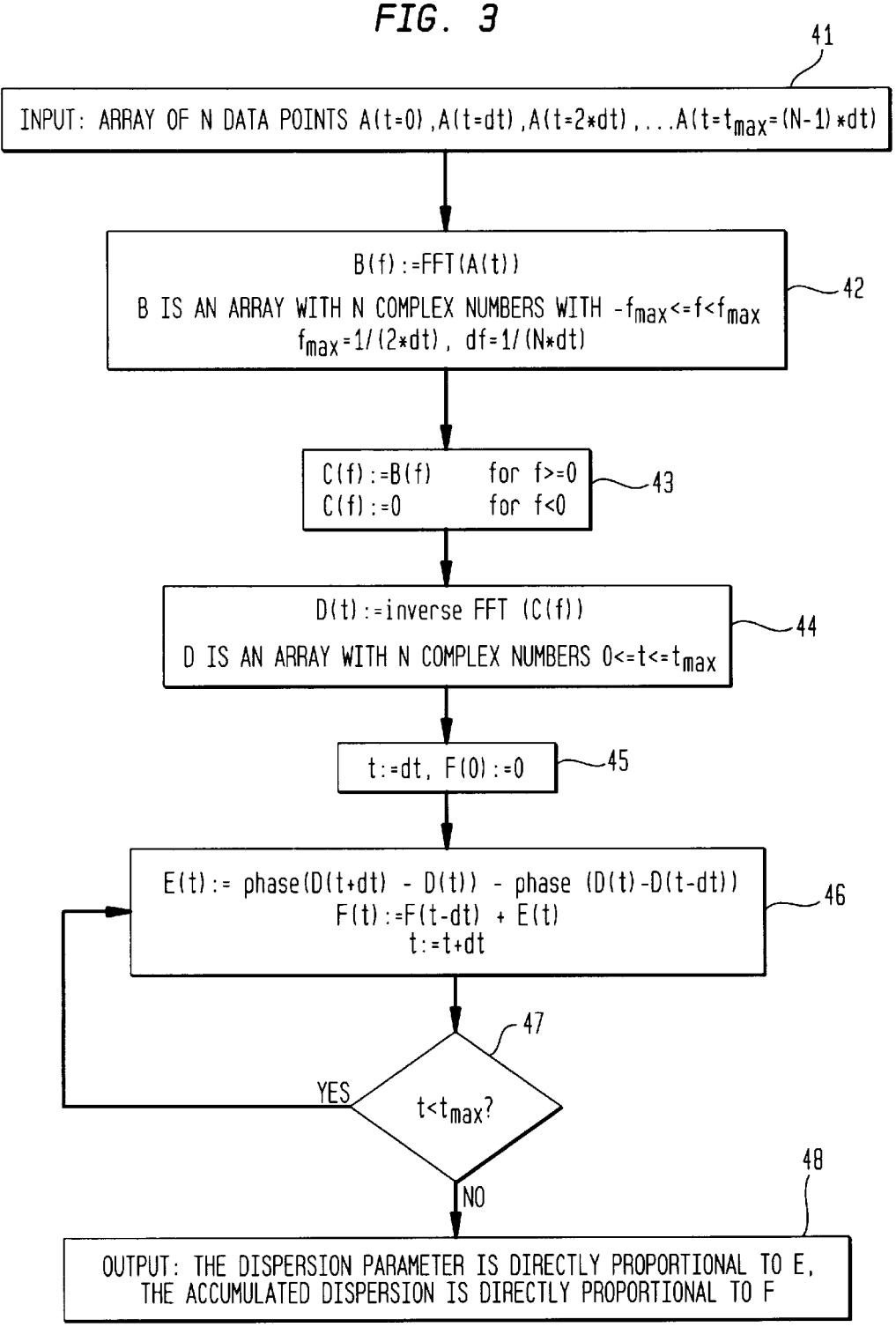
FIG. 3 is a flow chart of the algorithm that computes the dispersion map in the example of FIG. 1.

A simple and fast algorithm calculates the dispersion and the dispersion parameter as a function of distance. The flowchart of the algorithm is shown in FIG. 3. With reference thereto, operation block 40 indicates that the voltage signal being measured by the apparatus of FIG. 1, is being stored as an array A of real numbers. The length of A depends on the time interval $t_{max}$, which depends on the length of the fiber, and also on the sampling rate or its inverse dt, the time resolution. This leads to an array length $N = t_{max}/dt$.

Operation block 41 involves computation of the Fast Fourier Transform (FFT) of the array A and stores the result in array B. Since the FFT routine prefers to work with an array length that is a power of 2, the length of A should be increased to the next power of 2. It is assumed that N has been chosen initially to be a power of 2 which can be insured by extending the measurement time $t_{max}$ to a suitable value. In the end, B contains N complex numbers, describing the Fourier spectrum of the signal A within the frequency range $-f_{max}$ to $+f_{max}$. $f_{max} = 1/(2dt)$ is half the sampling rate. The frequency resolution of the FFT is $df = 2f_{max}/N = 1/(Ndt)$.

Operation 42 involves deletion of the negative frequencies. Since the original signal consists only of real numbers, the Fourier spectrum B is symmetric and the deletion causes no loss of information. The new spectrum C contains only positive Fourier frequencies or only components that circle counterclockwise in the complex plane.

Operation 44 involves computation of the inverse FFT. Since the negative Fourier components are all zero, the inverse FFT leads to a signal D that curves counter-clockwise around in the complex plane.

Operations 45, 46, and 47 form a loop in which there is computed the curvature E and the integral of the curvature F of the signal D. This is done by determining the phase difference between the two vectors that connect a given point to the point preceding and succeeding the given point.

Operation 48 involves scaling the values of F and G and plotting them as the dispersion parameter and the accumulated dispersion.

This algorithm generally works well for computing the instantaneous frequency of a linear oscillation.

Another improvement over the previous arrangement is the inclusion of the pump lasers 24 and 26 of any suitable form to provide Raman gain and thereby extend the range of the technique. Fiber loss causes attenuation of the waves at frequencies $\omega_1$ and $\omega_2$ and of the backscattered signal being measured, resulting in a signal decay length about four times shorter than the absorption length. However, by sending a few hundred milliwatts of pump light, at a wavelength of approximately 1450 nanometers, into the fiber 22 both from its near and the far end, a measurable signal power can be maintained over significantly larger distances. Since the pump lasers do not require any synchronization with the measurements, the present technique can measure the D-map of installed fibers in the field. If it is impractical to provide the pump light at both ends, it will still be useful to pump at only one end.

It is to be understood that the specific embodiment described is illustrative of the form of apparatus preferred at present for doing the measurements. In particular instances, it should be feasible to employ less than all of the improvements described.

Also it should also be feasible to displace the Stokes oscillation away from the origin by using a different kind of laser source and semiconductor amplifier switch and to use other frequencies and power levels.

Additionally, it should be feasible to employ algorithms other than the one described to calculate the dispersion and dispersion parameter as a function of distance.

What is claimed:

1. A method for measuring the dispersion map of an optical fiber under test that involves detecting the backscattered four-wave mixing oscillations resulting from the application to the optical fiber under test of pulses of two frequencies for four wave mixing and creating Stokes oscillations characterized in that at least one laser is included for applying pumping power to at least one end of the optical fiber for Raman amplification of the backscattered Stokes oscillation being detected.

2. A method in accordance with claim 1 in which a separate pump laser is included for applying pumping power at the same wavelength at each end of the optical fiber.

3. Apparatus for measuring the dispersion map of an optical fiber by the optical-time-domain reflection technique that involves measuring the backscattered Stokes oscillation comprising:

means for applying to the optical fiber under test pulses of two frequencies that are copolarized and coherent with the Stokes oscillations to displace the Stokes oscillation away from the origin;

means for applying laser pumping power to at least one of the two ends of the fiber for Raman amplifying the backscattered oscillations;

means for detecting the signal of the backscattered oscillations; and means for computing the dispersion map of the optical fiber by converting the linear oscillation given by the signal detected into a circular oscillation by taking the Fast Fourier Transform into a circular oscillation, eliminating the negative part of the symmetric spectrum and taking the inverse of the Fast Fourier Transform.

4. A method for measuring the dispersion map of an optical fiber by an optical-time-domain reflection technique that involves detection of the backscattered Stokes oscillations produced by four wave mixing comprising the steps of:

applying to the optical fiber for four wave mixing pulses of a pair of frequencies that produce a coherent seed field that displaces the Stokes oscillations away form the origin of the complex plane of the oscillations so that the oscillations can be detected all the way through; and detecting the displaced Stokes oscillations and providing therefrom the dispersion map with distance of the optical fiber.

5. A method for measuring the dispersion map of an optical fiber by an optical-time-domain reflection technique that involves detection of the backscattered Stokes oscillations produced by four wave mixing of pulses of two different wavelengths applied as inputs to the optical fiber comprising the steps of:

applying to one end of the optical fiber under test pulses of a pair of different wavelengths for four wave mixing and production of backscattered Stokes oscillations;

applying to at least one end of the optical fiber pumping power from a laser for providing gain to the backscattered Stokes oscillations; and detecting the backscattered oscillations and providing therefrom a dispersion map with distance of the optical fiber.

6. The method of claim 5 in which the two pulses of different wavelengths applied to one end of the optical fiber for four wave mixing produce a coherent seed field that displaces the Stokes oscillations away from the origins of the complex plane of the Stokes oscillations.

7. The method of claim 6 in which pumping power from a laser is provided to the optical fiber at each of its ends.

8. The method of claim 6 in which the detected Stokes oscillations are used to produce the dispersion map by an algorithm that converts the linear oscillation given by the signal into a circular oscillation by taking the Fast Fourier Transform, eliminating the negative part of its symmetric spectrum and taking the inverse of the Fast Fourier Transform.

9. Apparatus for measuring the dispersion of an optical fiber under test, comprising means for applying to one end of the fiber pulses of two frequencies that are copolarized and coherent with the resulting Stokes oscillations to create a coherent seed field to displace the resulting four-wave mixing signal away from the origin whereby there results from the beat between the coherent seed field and said four-wave mixing field a backscattered signal from said one end of the fiber, and means for detecting the backscattered signal and for using it to form a map of the dispersion of the fiber.

10. Apparatus in accordance with claim 9 that includes means for applying pumping light to the fiber for Raman amplification of the backscattered light.

11. Apparatus in accordance with claim 10 in which the means for applying pumping power applies power of identical frequency at each end of the optical fiber.

* * * * *